(12) United States Patent
Iritani (10) Patent No.: US 11,079,566 B2
(45) Date of Patent: Aug. 3, 2021

(54) OPTICAL APPARATUS THAT IS EASY TO ASSEMBLE, AND PREVENTS OCCURRENCE OF ASSEMBLING FAILURE

(71) Applicant: CANON KABUSHIKI KAISHA, Tokyo (JP)

(72) Inventor: Yuko Iritani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 290 days.

(21) Appl. No.: 16/274,504

(22) Filed: Feb. 13, 2019

(65) Prior Publication Data
US 2019/0258021 A1 Aug. 22, 2019

(30) Foreign Application Priority Data
Feb. 19, 2018 (JP) .............................. JP2018-027049

(51) Int. Cl.
*G02B 7/02* (2021.01)
*G02B 7/00* (2021.01)
*G02B 7/10* (2021.01)

(52) U.S. Cl.
CPC ............. *G02B 7/026* (2013.01); *G02B 7/003* (2013.01); *G02B 7/102* (2013.01)

(58) Field of Classification Search
CPC ......... G02B 7/026; G02B 7/003; G02B 7/102
USPC ....................................................... 359/642
See application file for complete search history.

(56) References Cited

U.S. PATENT DOCUMENTS

| 7,792,422 B2 * | 9/2010 | Mori ..................... G02B 7/102 396/144 |
| 8,565,591 B2 * | 10/2013 | Toyama ................... G02B 7/08 396/131 |
| 9,140,960 B2 * | 9/2015 | Cho ................ H04N 5/232945 |
| 9,152,020 B2 * | 10/2015 | Luo ....................... G03B 17/566 |
| 9,846,350 B2 * | 12/2017 | Takeshita ......... H04N 5/232123 |
| 2007/0147818 A1 * | 6/2007 | Mori ...................... G02B 7/102 396/144 |
| 2009/0279192 A1 * | 11/2009 | Harada ............ H04N 5/232123 359/825 |
| 2012/0328276 A1 * | 12/2012 | Toyama ................... G02B 7/08 396/85 |

(Continued)

FOREIGN PATENT DOCUMENTS

JP 2009003100 A 1/2009

*Primary Examiner* — William R Alexander
(74) *Attorney, Agent, or Firm* — Rossi, Kimms & McDowell LLP (57) ABSTRACT

An optical apparatus that is easy to assemble and prevents occurrence of an assembling failure. The optical apparatus includes an operation ring part having at least a focus ring and a zoom ring arranged along an optical axis and are rotatable thereabout. Encoders detect rotations of the focus ring and the zoom ring, respectively. A transmission mechanism is moved in accordance with rotation of the zoom ring and transmits rotation of the zoom ring to the encoder therefor. A regulation member regulates a range of rotation of the zoom ring to a predetermined angle range. When assembling the operation ring part, the encoders are inserted from the same direction, and the encoder for the focus ring is disposed in a range excluding an angle range through which the transmission mechanism is moved when the zoom ring is rotated through the predetermined angle range.

8 Claims, 9 Drawing Sheets

(56) References Cited

U.S. PATENT DOCUMENTS

| | | | |
|---|---|---|---|
| 2014/0016920 A1* | 1/2014 | Luo | G03B 13/32 396/144 |
| 2014/0168495 A1* | 6/2014 | Cho | G03B 3/10 348/333.02 |
| 2017/0235090 A1* | 8/2017 | Takeshita | G02B 7/02 348/345 |

* cited by examiner

OPTICAL APPARATUS THAT IS EASY TO ASSEMBLE, AND PREVENTS OCCURRENCE OF ASSEMBLING FAILURE

BACKGROUND OF THE INVENTION

Field of the Invention

The present invention relates to an optical apparatus, and more particularly to a structure of an operation ring part provided on an image pickup apparatus as one of optical apparatuses.

Description of the Related Art

In general, a video camera as one of image pickup apparatuses is equipped with various operation switches. For example, as the operation switches, the video camera includes a power switch for powering on or off, a zoom lever for adjusting an angle of view in a photographed image, and a trigger switch for instructing the start and stop of recording. One of these operation switches is a manual operation ring part in which a ring-shaped member is operated for rotation.

The manual operation ring part, which is formed into a circular ring, is mainly disposed around a photographic lens unit, and has the center of rotation on an optical axis of the photographic lens unit. Further, examples of the manual operation ring part include one having a plurality of operation rings serially and coaxially arranged, and in this manual operation ring part, different functions are assigned to the operation rings, respectively.

Here, a general structure of the manual operation ring part will be described.

The manual operation ring part includes an operation ring, and the operation ring is rotatably assembled to a base member which is integrally fixed to an image pickup apparatus casing. The operation ring is rotated while having part thereof brought into contact with the base member. Further, to detect a rotational phase of the operation ring, a rotary-type sensor is assembled to the base member.

A gear is provided on the circumference of the operation ring, and a pinion is provided on a shaft of the rotary-type sensor. Then, the gear arranged on the operation ring and the pinion are connected to each other to thereby detect a rotational phase in accordance with rotation of the operation ring. Note that Japanese Laid-Open Patent Publication (Kokai) No. 2009-3100 proposes a lens drive device in which a gear is provided on the circumference of an operation ring and the operation ring is rotated by a motor.

In a case where a plurality of operation rings are provided, to make it easy to operate the operation rings, the outer diameters of the operation rings are sometimes made substantially equal to each other so as to make the outer peripheral surfaces of the operation rings substantially in flush with each other. Further, a lens barrel is disposed inside the operation rings. It is desirable that each operation ring has its whole periphery exposed to the outside as much as possible in order to support various usages of users.

To realize this, there has been proposed a structure in which a rotation detection section is incorporated in each operation ring such that a rotary-type sensor and a gear are arranged in a space surrounded by the lens barrel and the inner peripheral surface of the operation ring. In this structure, the rotary-type sensor belonging to a forward operation ring disposed at a forward location sometimes overlaps with a gear of a rearward operation ring disposed at a rearward location. On the other hand, the rotary-type sensors are sometimes collectively connected to the same FPC (Flexible Printed Circuit) so as to reduce the costs.

Incidentally, when assembling the rotary-type sensors connected to the same FPC, to prevent entanglement with the FPC when assembling into the rotation detection section, the rotary-type sensors are assembled from the same direction. Further, it is desirable that the rotary-type sensors provided for the respective operation rings are assembled according to the same procedure.

However, in a case where the rotary-type sensor belonging to the forward operation ring overlaps with the gear disposed on the rearward operation ring, the gear disposed on the rearward operation ring may be broken when assembling the rotary-type sensor belonging to the forward operation ring. This causes an assembling failure.

SUMMARY OF THE INVENTION

The present invention provides an optical apparatus that is easy to assemble and prevents occurrence of an assembling failure.

The present invention provides an optical apparatus that includes an operation ring part having at least a first operation ring and a second operation ring, which are arranged along a predetermined axis, and are rotatable about the predetermined axis, comprising a first detection section that detects rotation of the first operation ring, a second detection section that detects rotation of the second operation ring, a transmission mechanism that is moved in accordance with rotation of the second operation ring, and transmits rotation of the second operation ring to the second detection section, and a regulation member that regulates a range of rotation of the second operation ring to a predetermined angle range, wherein when assembling the operation ring part, the first detection section and the second detection section are inserted from the same direction, and the first detection section is disposed in a range excluding an angle range through which the transmission mechanism is moved when the second operation ring is rotated through the predetermined angle range.

According to the present invention, it is easy to assemble the optical apparatus, and an assembling failure is prevented from occurring.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

The following description will be given of an example of an optical apparatus according to an embodiment of the present invention. In the following description, an image pickup apparatus as the example of the optical apparatus will be described by way of example.

Figure 1A:
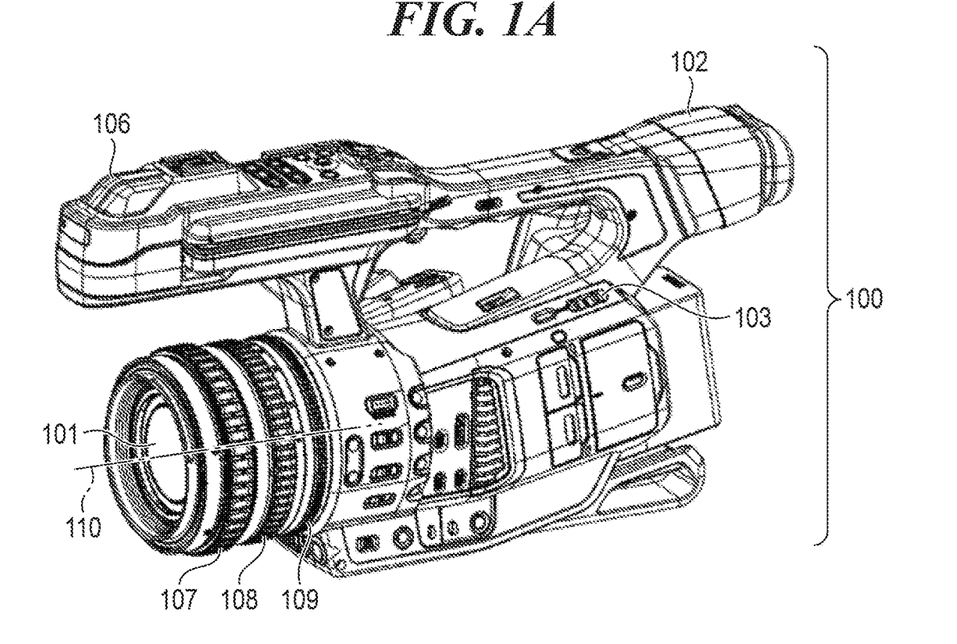
FIGS. 1A and 1B are perspective views each showing the appearance of an example (video camera) of an image pickup apparatus as an optical apparatus according to an embodiment of the present invention.
Figure 1B:
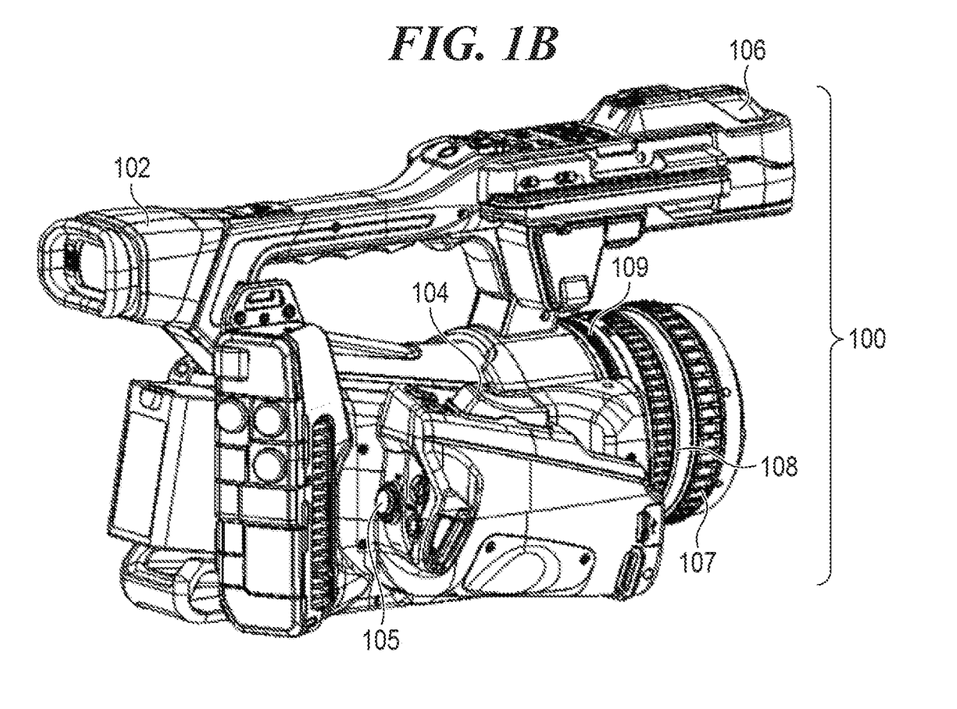

FIGS. 1A and 1B are perspective views each showing the appearance of an example of the image pickup apparatus according to the embodiment of the present invention. FIG. 1A is the perspective view, as viewed from the front, and FIG. 1B is the perspective view, as viewed from the rear.

The illustrated image pickup apparatus is e.g. a video camera (hereinafter simply referred to as the camera) 100 and includes a photographic lens unit (hereinafter simply referred to as the photographic lens) 101. Further, the camera 100 is provided with a viewfinder 102, a power switch 103, a zoom lever 104, a trigger switch 105, and a built-in microphone 106.

A photographed image or a recorded image is displayed on the viewfinder 102. The zoom lever 104 is used for adjusting an angle of view in a photographed image. The trigger switch 105 is used for instructing the start and stop of recording. Further, voices and sounds of an object and its surroundings are collected by the built-in microphone 106.

The illustrated camera 100 has an operation ring part, and in the present example, the operation ring part includes operation rings 107, 108, and 109. These operation rings 107, 108, and 109 are arranged around the photographic lens 101. The operation rings 107, 108, and 109 are rotatable about an optical axis 110 of the photographic lens 101.

In the illustrated example, the operation ring 107 is a focus ring used when focusing on an object, and the operation ring 108 is a zoom ring used when adjusting an angle of view in a photographed image. Further, the operation ring 109 is an aperture ring used when adjusting the brightness of an object. These operation rings 107 to 109 are arranged in parallel with the optical axis and are rotatable (movable) about the optical axis. Note that in the following description, the operation rings 107, 108, and 109 are sometimes referred to as the focus ring 107, the zoom ring 108, and the aperture ring 109, respectively.

Figure 2:
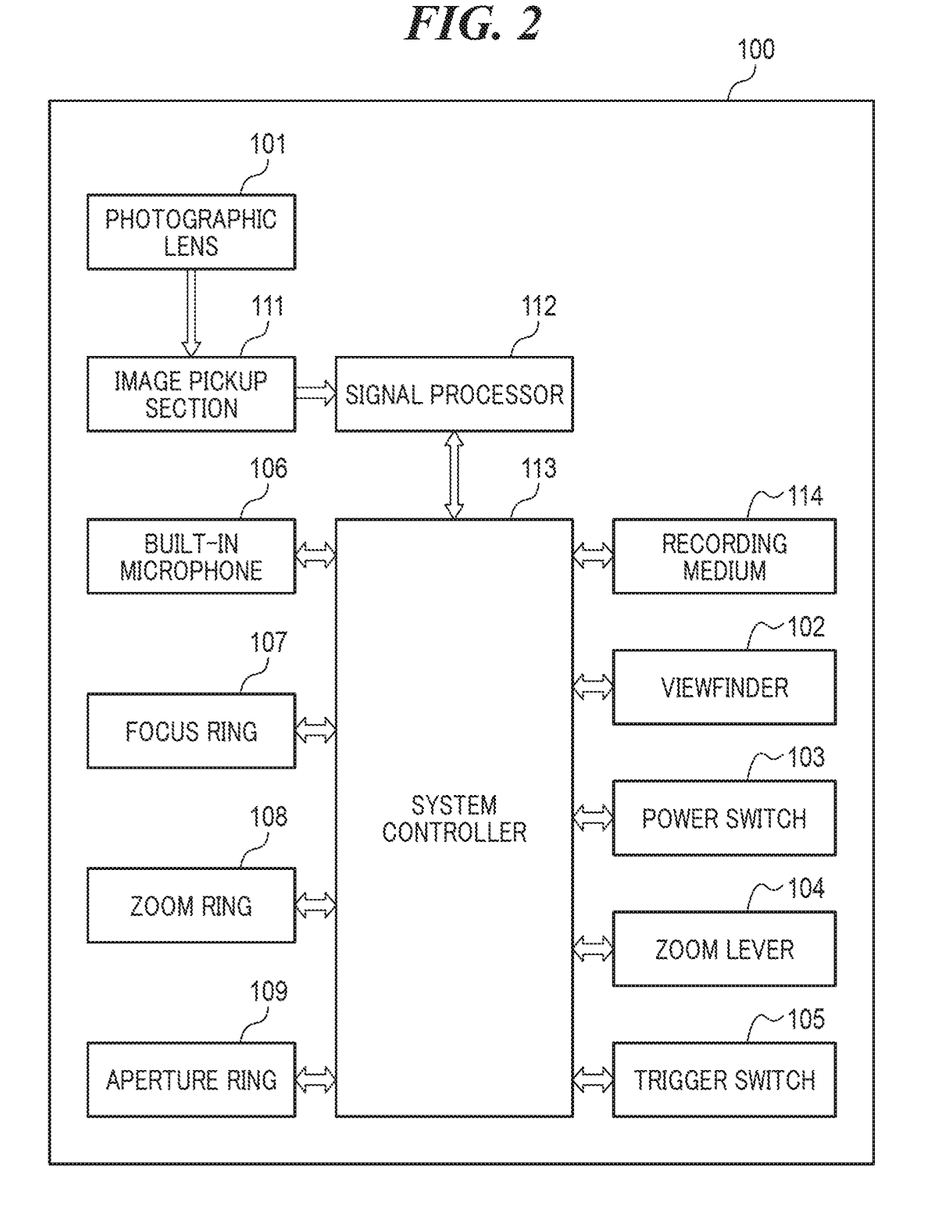
FIG. 2 is a block diagram showing an example of the configuration of the video camera shown in FIG. 1.

FIG. 2 is a block diagram showing an example of the configuration of the camera 100 shown in FIG. 1. Note that the same component elements in FIG. 2 as those of the camera 100 shown in FIG. 1 are denoted by the same reference numerals.

When performing photographing, a photographer operates the power switch 103 to power on the camera 100. After the camera 100 is powered on, an optical image is formed on an image pickup section 111 through the photographic lens 101, and the image pickup section 111 outputs image signals (video signals) according to the optical image. Note that the image pickup section 111 includes an image pickup device, such as a CCD or a CMOS sensor.

Next, the image pickup section 111 amplifies the video signals, and sends the amplified video signals to a signal processor 112. The signal processor 112 performs predetermined signal processing on the video signals under the control of a system controller 113. The system controller 113 causes a video corresponding to the video signals output from the signal processor 112 to be displayed on the viewfinder 102.

The photographer confirms the video using the viewfinder 102 and adjusts the photographing view angle by operating the zoom lever 104 or the zoom ring 108 as required. Further, the photographer operates the focus ring 107 to focus the lens on the object and operates the aperture ring 109 to adjust the brightness of the object.

At this time, operation signals corresponding to the operations of the zoom lever 104, and the operation rings 107, 108, and 109 are sent to the system controller 113. Then, the system controller 113 controls a focus lens, a zoom lens, and an aperture adjustment mechanism, provided in the photographic lens 101, according to the received operation signals.

After thus setting the angle of view, the focus, and the brightness, the photographer starts recording a video by operating the trigger switch 105. In response to the operation of the trigger switch 105, the system controller 113 records the video in a recording medium 114. Further, the system controller 113 records sounds collected by the built-in microphone 106 in the recording medium 114 in synchronism with the video.

Figure 3A:
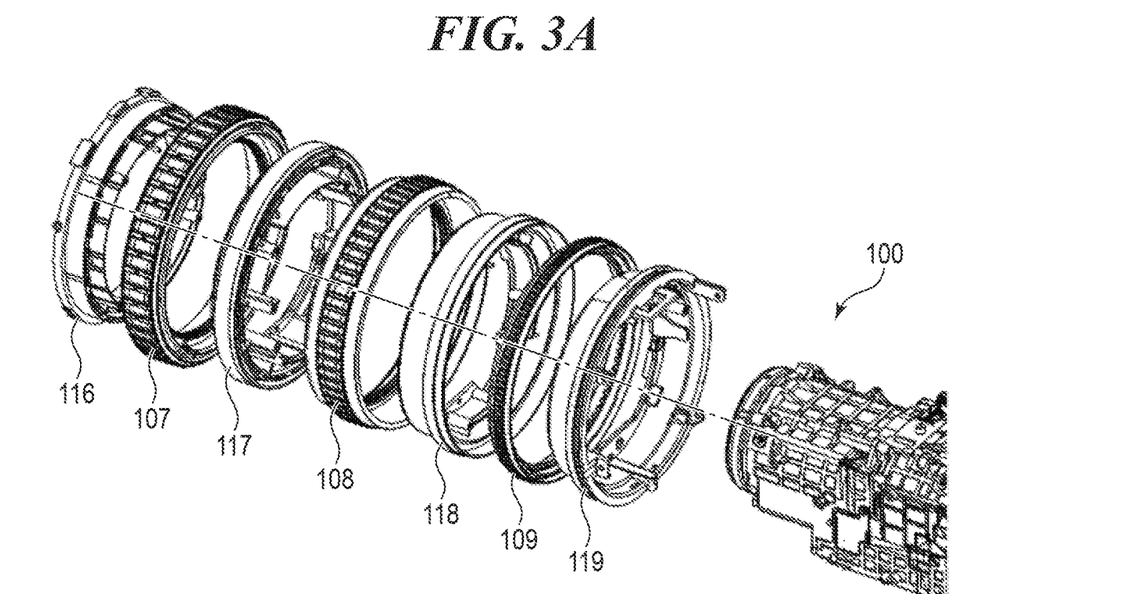
FIGS. 3A and 3B are a perspective view and a side view, showing a structure of an operation ring part appearing in FIG. 1, in an exploded state and in a broken state, respectively.
Figure 3B:
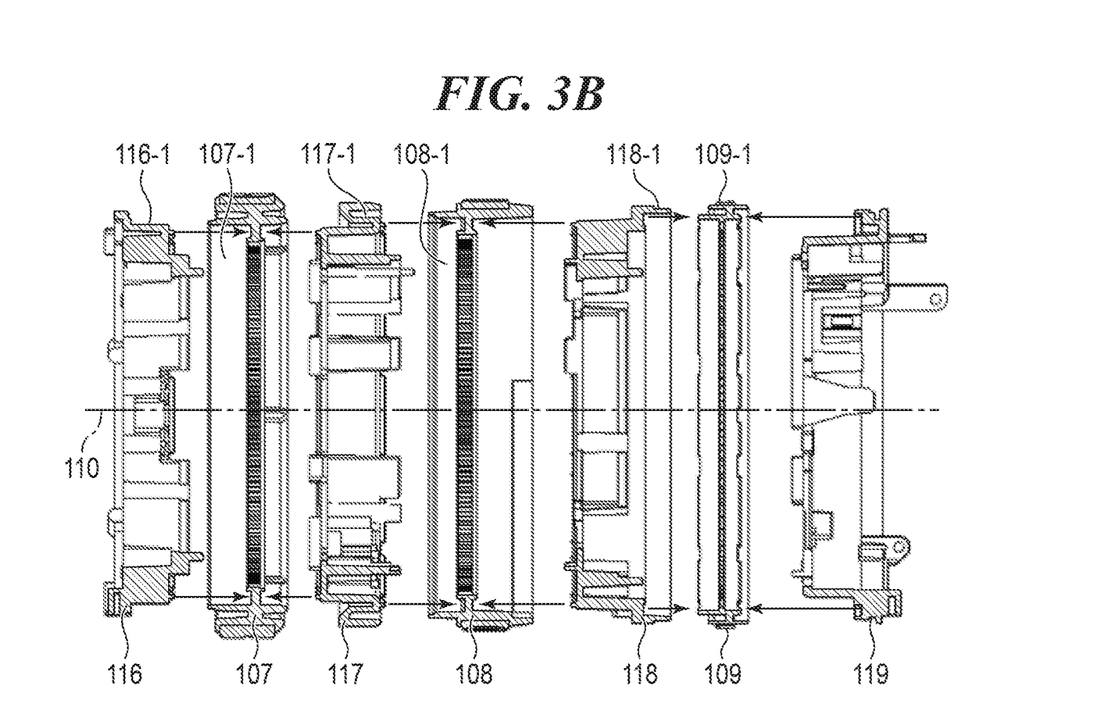

FIGS. 3A and 3B are views useful in explaining a structure of the operation ring part appearing in FIG. 1. FIG. 3A is a perspective view showing the operation ring part in an exploded state, and FIG. 3B is a side view showing the operation ring part in a broken state. Note that in the state shown in FIG. 3A, the operation ring part is exploded in the direction of the optical axis 110.

The operation ring part includes base members 116, 117, 118, and 119. The base members (regulation members) 116, 117, 118, and 119 regulate rotational movement of the operation rings 107, 108, and 109, and are used for rotatably fixing the operation rings 107, 108, and 109 to the camera 100, respectively. Note that in the following description, the base members 116, 117, 118, and 119 are sometimes referred to as the focus ring base 116, the zoom ring base 117, the aperture ring base 118, and the lens base 119, respectively.

As shown in FIGS. 3A and 3B, the focus ring base 116, the focus ring 107, the zoom ring base 117, the zoom ring 108, the aperture ring base 118, the aperture ring 109, and the lens base 119 are assembled in a state layered in the mentioned order from the object side and the bases 116, 117, 118 and 119 are fixed. After these components are assembled and fixed, the photographic lens 101 is inserted through the inside of the operation ring part, and the operation ring part is fixed to the camera 100.

When the focus ring base 116 and the zoom ring base 117 are fixed, the focus ring 107 is sandwiched between the focus ring base 116 and the zoom ring base 117 and is held in the optical axis direction. An inner peripheral surface 107-1 of the focus ring 107 and a cylindrical outer peripheral surface 116-1 of the focus ring base 116 are fitted to each other to thereby regulate movement of the focus ring 107 in a radial direction. The focus ring 107 can be rotated through 360 degrees.

Similarly, when the zoom ring base 117 and the aperture ring base 118 are fixed, the zoom ring 108 is sandwiched between the zoom ring base 117 and the aperture ring base 118 and is held in the optical axis direction. An inner peripheral surface 108-1 of the zoom ring 108 and a cylindrical outer peripheral surface 117-1 of the zoom ring base 117 are fitted to each other to thereby regulate movement of the zoom ring 108 in a radial direction. The zoom ring 108 has its rotational phase regulated as described hereinafter.

When the aperture ring base 118 and the lens base 119 are fixed, the aperture ring 109 is sandwiched between the aperture ring base 118 and the lens base 119 and is held in the optical axis direction. An inner peripheral surface 109-1 of the aperture ring 109 and an outer peripheral surface 118-1 of the aperture ring base 118 are fitted to each other to thereby regulate movement of the aperture ring 109 in a radial direction. The aperture ring 109 can be rotated through 360 degrees.

Figure 4A:
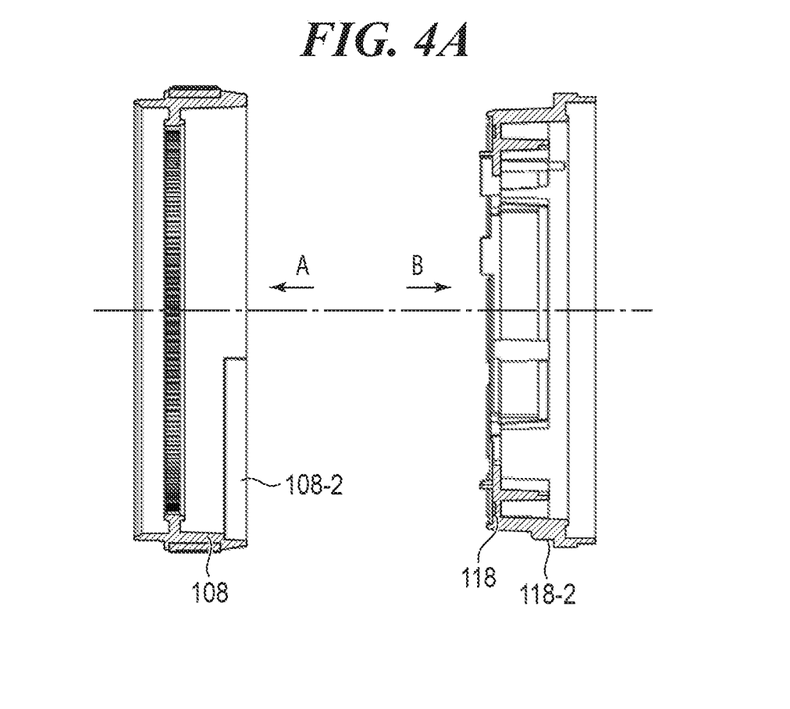
FIGS. 4A and 4B are views useful in explaining a zoom ring and an aperture ring base, appearing in FIG. 3A, respectively.
Figure 4B:
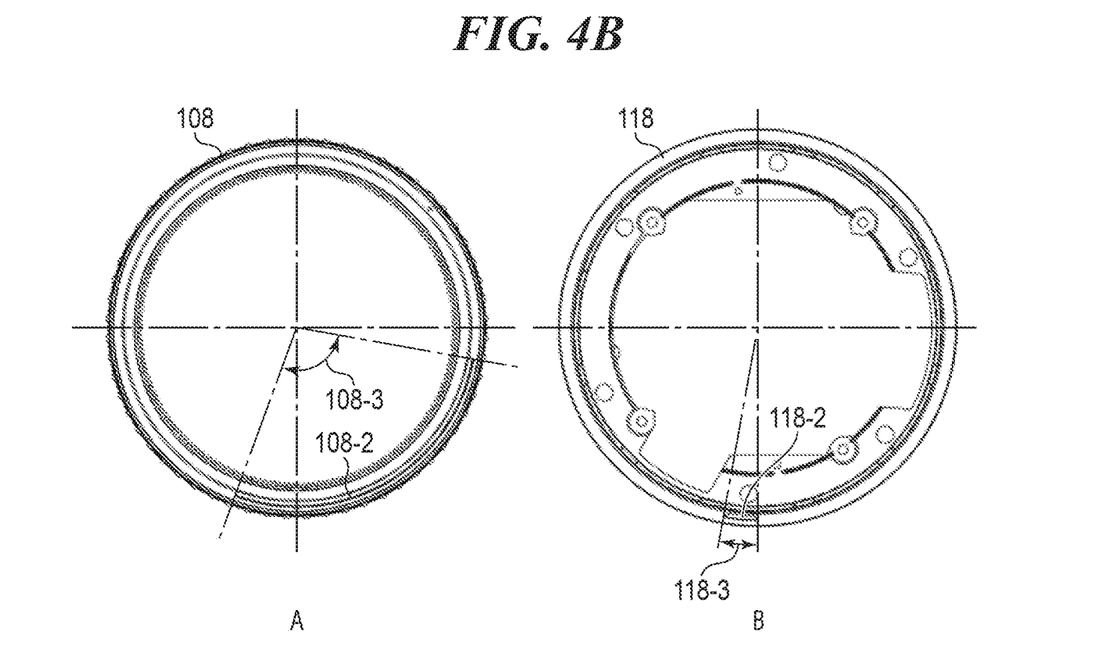

FIGS. 4A and 4B are views useful in explaining the zoom ring 108 and the aperture ring base 118, appearing in FIGS. 3A and 3B. FIG. 4A shows the zoom ring 108 and the aperture ring base 118 in a state broken away at a plane orthogonal to the optical axis, and FIG. 4B shows the zoom ring 108 and the aperture ring base 118 as viewed from respective directions indicated by arrows A and B. Note that in FIG. 4A, the left side corresponds to the object side, and the right side corresponds to the camera side.

The zoom ring 108 has an inner peripheral surface formed with a guide groove 108-2, and the aperture ring base 118 is formed with a protruding shape portion used as a stopper (regulation member) 118-2. The guide groove 108-2 is formed in the zoom ring 108 such that it extends partially along the inner periphery thereof, and as a result, the guide groove 108-2 has a phase range 108-3. In the illustrated example, the phase range 108-3 is specified to an angle of 100 degrees.

The stopper 118-2 formed on the aperture ring base 118 partially protrudes from a surrounding arcuate portion of the aperture ring base 118 over a phase range 118-3. In the illustrated example, the phase 118-3 is specified to an angle of 10 degrees.

When the zoom ring 108 is assembled to the aperture ring base 118 by adjusting the phases of them, the stopper 118-2 is fitted in the guide groove 108-2. As a result, the stopper 118-2 can be rotated only within a range regulated by the guide groove 108-2. That is, a phase range through which the stopper 118-2 is rotatable is regulated by the guide groove 108-2. Thus, in the illustrated example, the zoom ring 108 can be rotated through an angle of 90 degrees.

Figure 5A:
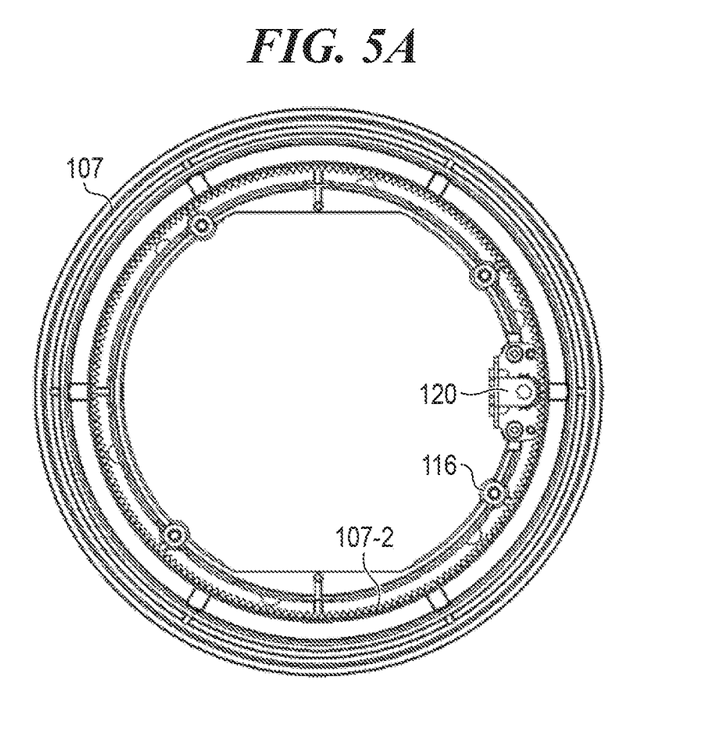
FIGS. 5A and 5B are views useful in explaining a detection section for detecting rotation of a focus ring appearing in FIG. 3A.
Figure 5B:
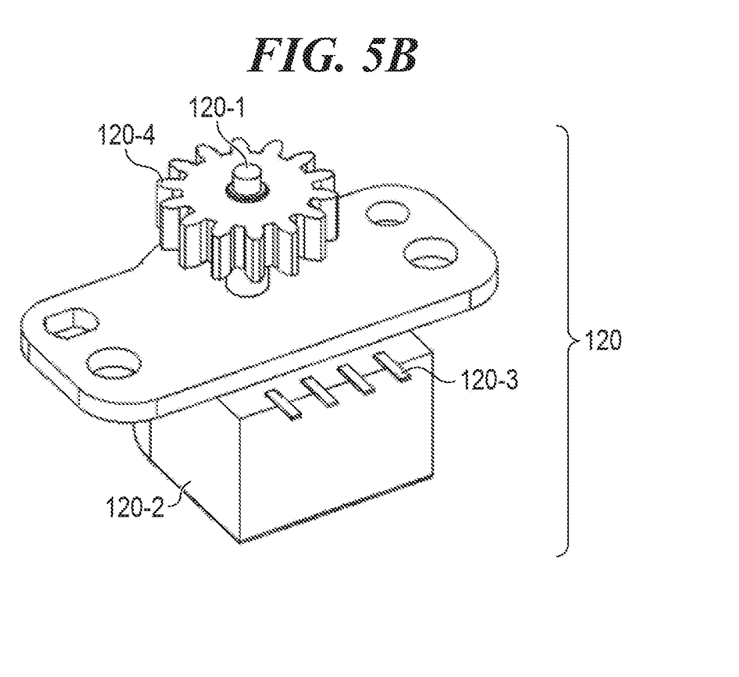

FIGS. 5A and 5B are views useful in explaining a detection section for detecting rotation of the focus ring 107 appearing in FIG. 3A. FIG. 5A is a view of the focus ring 107, as viewed from the camera side, and FIG. 5B is a perspective view of an encoder as the detection section. Note that in FIG. 5A, the components at respective locations rearward of the zoom ring base 117 are omitted from illustration for convenience of explanation.

As shown in FIG. 5A, the focus ring 107 has an inner peripheral surface formed with a gear 107-2. Further, the focus ring base 116 has the encoder, denoted by reference numeral 120, fixed thereto with screws.

The encoder 120 is provided with a rotation detection section 120-2, and a shaft 120-1 extending in an upper direction as viewed in FIG. 5B is provided for the rotation detection section 120-2. Further, the rotation detection section 120-2 is provided with electrical contacts 120-3. The rotation detection section 120-2 includes a detection element, such as a magnetic or optical detection element, and detects rotation of the shaft 120-1. Then, the rotation detection section 120-2 sends an electrical signal corresponding to an amount of rotation of the shaft 120-1 from the electrical contacts 120-3 to the signal processor 112 via an FPC or wires.

A pinion gear 120-4 is pressed in and fixed to the shaft 120-1 and is in mesh with the gear 107-2 formed on the focus ring 107. The pinion gear 120-4 and the gear 107-2 form a transmission mechanism.

When the focus ring 107 is rotated, rotation of the focus ring 107 is detected by the encoder 120 via the pinion gear 120-4, and the encoder 120 sends an electrical signal corresponding to the amount of rotation to the signal processor 112. Then, the system controller 113 receives the electrical signal via the signal processor 112 and operates the photographic lens 101 according to the received electrical signal, i.e. the amount of rotation.

Figure 6:
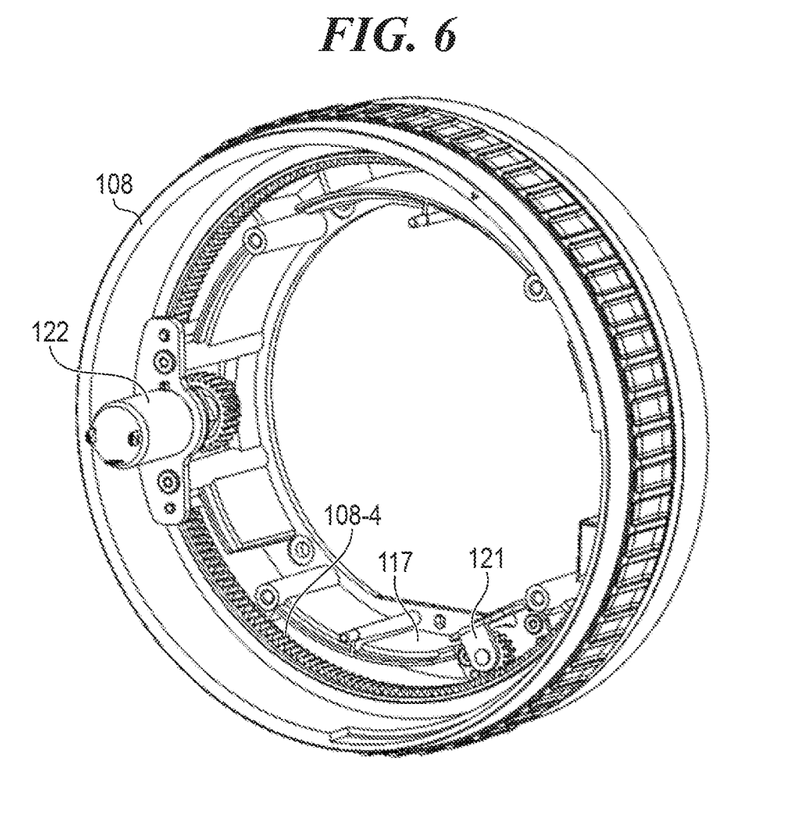
FIG. 6 is a view useful in explaining a detection section for detecting rotation of the zoom ring appearing in FIG. 3A.

FIG. 6 is a view useful in explaining a detection section for detecting rotation of the zoom ring 108 appearing in FIG. 3A. FIG. 6 is a perspective view of the zoom ring 108, as viewed from the camera side. Note that in FIG. 6, only the zoom ring 108, the zoom ring base 117, an encoder 121, and a potentiometer 122 are illustrated for convenience of explanation.

The zoom ring 108 has an inner peripheral surface formed with a gear 108-4 over the whole circumference. Further, the encoder 121 is fixed to the zoom ring base 117 with screws. The encoder 121 used for detecting rotation of the zoom ring 108 has the same structure as that of the encoder 120. Therefore, the pinion gear 121-1 of the encoder 121 and the gear 108-4 of the zoom ring 108 form a transmission mechanism.

When the zoom ring 108 is rotated, rotation of the zoom ring 108 is detected by the encoder 121, and the encoder 121 sends an electrical signal corresponding to the amount of rotation to the signal processor 112. Then, the system controller 113 receives the electrical signal via the signal processor 112 and operates the photographic lens 101 according the received electrical signal, i.e. the amount of rotation.

Further, in the illustrated example, the potentiometer 122 is fixed to the zoom ring base 117 with screws. Although not shown, similar to the encoder 120, the potentiometer 122 has a shaft, a pinion fitted on the shaft, and electrical contacts. The gear 108-4 formed on the zoom ring 108 and the pinion provided on the potentiometer 122 are meshed with each other, whereby the potentiometer 122 is rotated in accordance with rotation of the zoom ring 108. Then, the potentiometer 122 sends an electrical signal corresponding to the phase of the zoom ring 108 to the signal processor 112.

Thus, the encoder 121 and the potentiometer 122 are used for detecting rotation of the zoom ring 108. The encoder 121 is provided with a magnetic or optical detection element, which detects rotation of the zoom ring 108 with high accuracy. When the zoom ring 108 is rotated, the system controller 113 processes the electrical signal corresponding to the amount of rotation of the zoom ring 108 and drives the photographic lens 101.

On the other hand, the potentiometer 122 has a detection element, such as a variable resistor, and roughly detects a rotational position (also simply referred to as the position) of the zoom ring 108. In the present example, when the camera 100 is powered on, first, the position of the zoom ring 108 is detected by the potentiometer 122. Then, the system controller 113 drives the photographic lens 101 according to the position of the zoom ring 108. Further, the system controller 113 drives the photographic lens 101 to obtain an angle of view set based on rotation of the zoom ring 108, according to a result of detection by the encoder 121.

When assembling the operation ring part, as shown in FIG. 3B, first, the focus ring 107 is inserted from the camera side to be fitted on the focus ring base 116 coaxially with the optical axis. Then, the zoom ring base 117 is inserted from the camera side, and the focus ring base 116 and the zoom ring base 117 are fastened to each other with screws. Then, the zoom ring 108 is inserted from the camera side coaxially with the optical axis.

Figure 7:
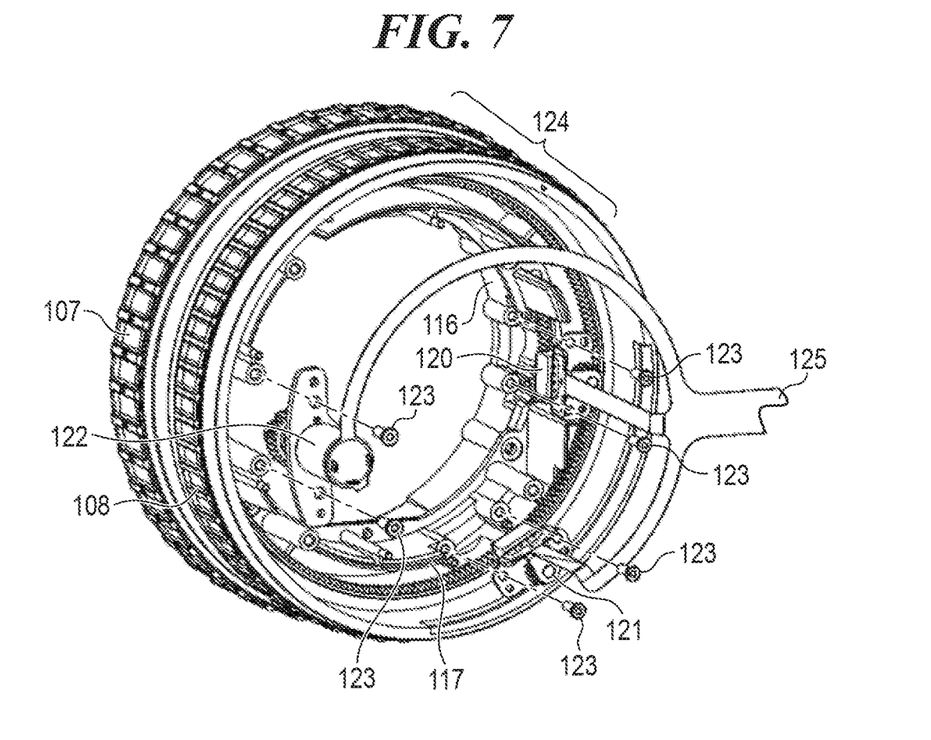
FIG. 7 is a perspective view showing a focus ring base, the focus ring, a zoom ring base, and the zoom ring, appearing in FIG. 3A, in an assembled state.

FIG. 7 is a perspective view showing the focus ring base 116, the focus ring 107, the zoom ring base 117, and the zoom ring 108, appearing in FIG. 3A, in an assembled state.

The state of the operation ring part assembled up to the zoom ring 108 as described above is an assembly 124 shown in FIG. 7. In the assembly 124, the zoom ring 108 is on a near side, and the focus ring 107 is on a far side, as viewed from the assembling direction.

In this state, the encoder 120 for detecting rotation of the focus ring 107, and the encoder 121 and the potentiometer 122 for detecting rotation of the zoom ring 108 are inserted from the camera side. The encoders 120 and 121 and the potentiometer 122 are connected to the same FPC (wiring) 125. Then, the encoders 120 and 121 and the potentiometer 122 are each fixed to the focus ring base 116 or the zoom ring base 117 by having a fixing plate thereof, which is arranged orthogonally to the axis, fastened to the focus ring base 116 or the zoom ring base 117 with screws 123 at two locations.

When assembling the FPC 125, since the encoders 120 and 121 and the potentiometer 122 are provided, entanglement with the FPC 125 is likely to occur. On the other hand, as described above, by assembling the encoders 120 and 121 and the potentiometer 122 from the same direction collectively in the same process, it is possible to prevent entanglement with the FPC 125. Further, it is possible to avoid occurrence of a connection failure e.g. due to breakage of the FPC 125.

Figure 8:
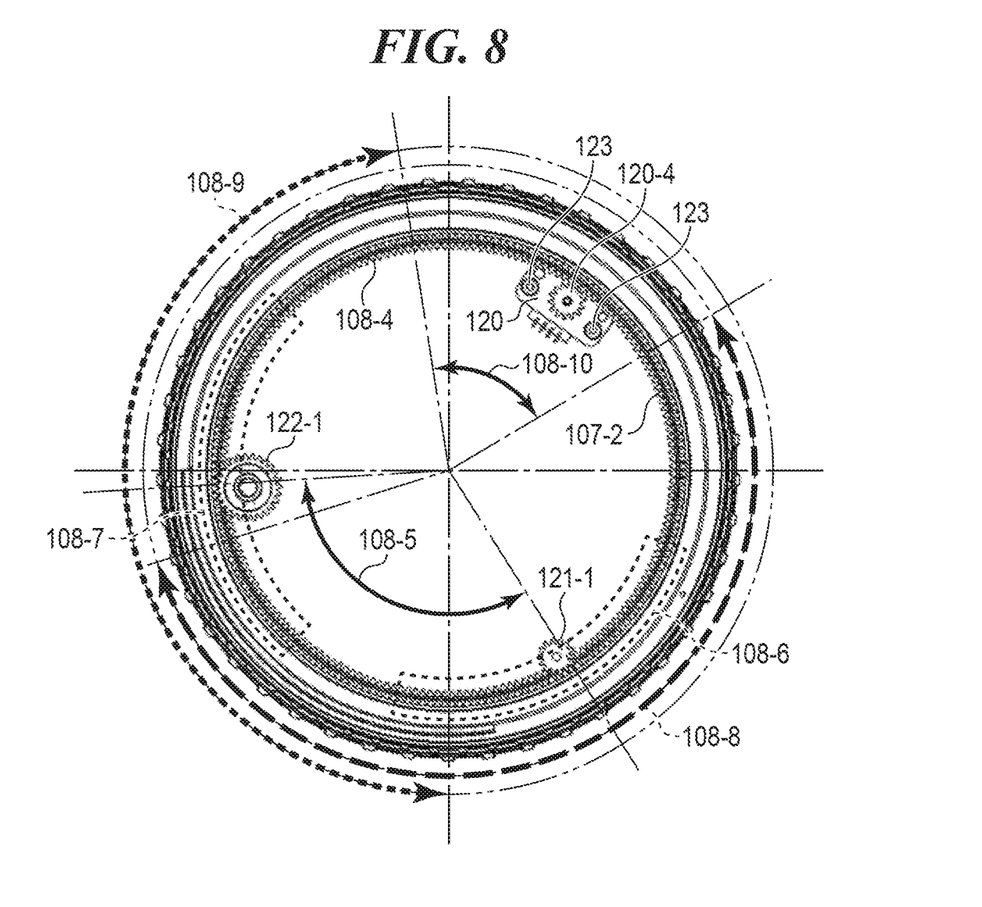
FIG. 8 is a view showing an example of the arrangement of encoders and a potentiometer, appearing in FIG. 7.

FIG. 8 is a view showing an example of the arrangement of the encoders 120 and 121 and the potentiometer 122, appearing in FIG. 7. Note that in FIG. 8, the encoder 120, a pinion gear 121-1 of the encoder 121, and a pinion gear 122-1 of the potentiometer 122 are illustrated for convenience of explanation.

As shown in FIG. 8, the pinion gear 120-4 is engaged with the gear 107-2 formed on the focus ring 107. Further, the pinion gear 121-1 and the pinion gear 122-1 are engaged with the gear 108-4 formed on the zoom ring 108. In the present example, the pinion gear 121-1 and the pinion gear 122-1 are arranged with an angle 108-5, which is not smaller than 90 degrees, about the optical axis therebetween. In the illustrated example, the angle 108-5 is set to 100 degrees.

As described above, the rotation of the zoom ring 108 is regulated to the rotational range of 90 degrees, and hence when the zoom ring 108 is rotated through a range of 0 degree to 90 degrees, the range within which the encoder 121 is engaged with the gear 180-4 is an angle range 108-6, whereas the range within which the potentiometer 122 is engaged with the gear 108-4 is an angle range 108-7.

By operating the zoom ring 108, friction caused by meshing of the gears causes wear of the gears, but the angle ranges 108-6 and 108-7 do not overlap with each other, and hence it is possible to prevent locally-caused wear of the gear 108-4.

Further, when the zoom ring 108 is rotated through the whole range from 0 to 90 degrees, the angle range 108-6 passes an angle range 108-8. Further, when the zoom ring 108 is rotated through the whole range, the angle range 108-7 passes an angle range 108-9.

On the other hand, there is an angle range 108-10 where parts of the gear 108-4 for engagement with the encoder 121 and the potentiometer 122 do not pass even when the zoom ring 108 is rotated through the whole range. Therefore, in this example, the encoder 120 is disposed in the angle range 108-10.

When assembling the encoder 120 which is located on the far side as viewed from the assembling direction, the encoder 120 passes near the gear 108-4 of the zoom ring 108 on the near side. However, a part of the gear 108-4 on an assembling locus of the encoder 120 is located in the angle range 108-10 where the parts of the gear 108-4 for engagement with the encoder 121 and the potentiometer 122 do not pass, and hence the function of the operation ring part is prevented from being impaired.

Further, the positions where the screws 123 are fastened to fix the encoder 120 are arranged in the angle range 108-10. With this, although the shaft of a screwdriver or the like inserted from the zoom ring side when fastening each screw passes near the gear 108-4 on the near side, since the screws are in the positions in the angle range 108-10 where the parts of the gear 108-4 for engagement with the encoder 121 and the potentiometer 122 do not pass, the function of the operation ring part is prevented from being impaired during assembling of the operation ring part.

Here, a variation of the above-described embodiment will be described.

Figure 9:
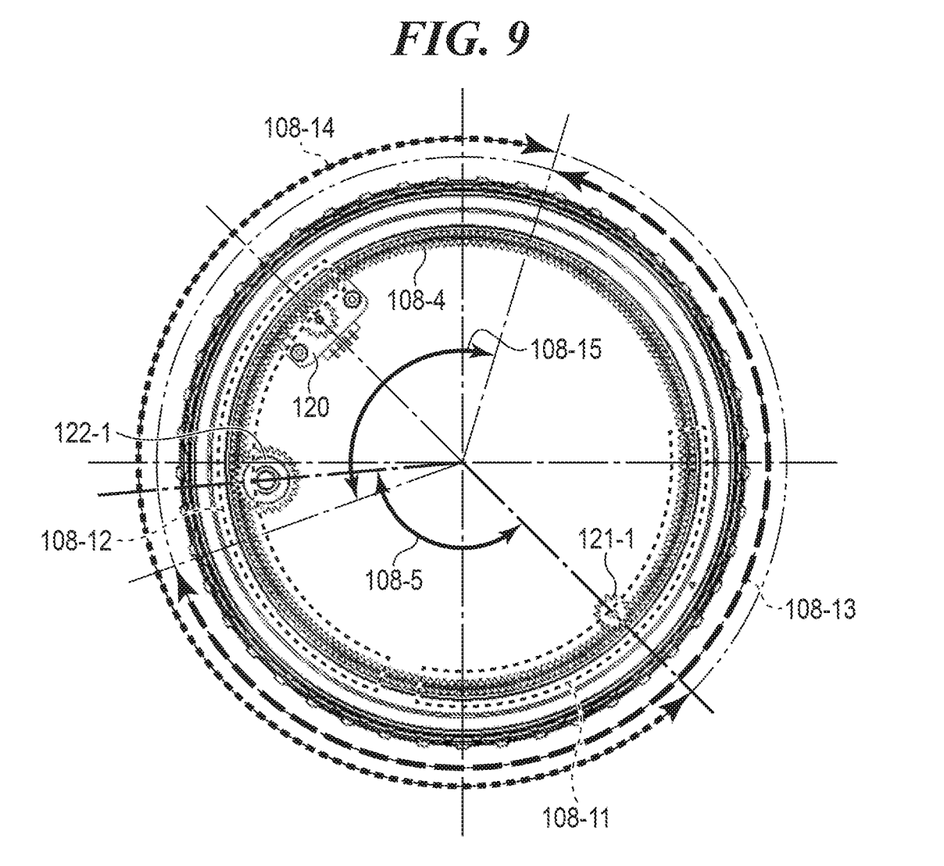
FIG. 9 is a view showing another example of the arrangement of the encoders and the potentiometer, appearing in FIG. 7.

FIG. 9 is a view showing another example of the arrangement of the encoders and the potentiometer, appearing in FIG. 7. Note that in FIG. 9, it is assumed that rotation of the zoom ring 108 is regulated to a rotational range of 120 degrees, and ranges of use of the gear 108-4 when rotation is regulated to the rotational range of 120 degrees are indicated.

The pinion gear 121-1 of the encoder 121 and the pinion gear 122-1 of the potentiometer 122, which are engaged with the zoom ring 108, are arranged at an angular interval 108-5 which is not smaller than 120 degrees. In the present example, the angular interval 108-5 is set to 130 degrees. Since the rotation of the zoom ring 108 is regulated to the angle range of 120 degrees, the range within which the encoder 121 is engaged with the gear 108-4 is an angle range 108-11, whereas the range within which the potentiometer 122 is engaged with the gear 108-4 is an angle range 108-12.

By operating the zoom ring 108, friction caused by meshing of the gears causes wear of the gear 108-4, but the angle range 108-11 associated with the encoder 121 and the angle range 108-12 associated with the potentiometer 122 do not overlap with each other, and hence it is possible to prevent locally-caused wear of the gear 108-4.

Further, when the zoom ring 108 is rotated through the whole range, the angle range 108-11 passes an angle range 108-13. Further, when the zoom ring 108 is rotated through the whole range, the angle range 108-12 passes an angle range 108-14. There is an angle range 108-15 where only a part of the gear 108-4 for engagement with the potentiometer 122 passes but a part of the gear 108-4 for engagement with the encoder 121 does not pass, when the zoom ring 108 is rotated through the whole range. Therefore, the encoder 120 of the focus ring 107 is disposed in the angle range 108-15.

With this arrangement, when assembling the encoder 120 on the far side as viewed from the assembling direction, the encoder 120 passes near the gear of the zoom ring 108 on the near side. On the other hand, a part of the gear 108-4 on an assembling locus of the encoder 120 in the angle range 108-15 is a gear part which is engaged only with the potentiometer 122.

As described above, the encoder 121 detects rotation of the zoom ring 108 with high accuracy, and the potentiometer 122 roughly detects the position of the zoom ring 108. Therefore, by disposing the encoder 120 of the focus ring 107 in the angle range 108-15 where only the potentiometer 122 is engaged, it is possible to prevent the part of the gear 108-4 for engagement with the encoder 121 which performs detection with high accuracy from being damaged, and hence the function of the operation ring part is not impaired.

As described heretofore, in the present embodiment, when assembling the rotation detection sensors connected to the same FPC, the rotation detection sensors are assembled from the same direction to prevent entanglement with the FPC. Further, the rotation detection sensors used for the plurality of operation rings are assembled in the same process. With this, in a case where a rotation detection sensor belonging to a forward operation ring overlaps with the gear of a rearward operation ring, the rotation detection sensor belonging to the forward operation ring is disposed according to the position of the gear at a rearward location or the position of the sensor which is lower in detection accuracy. This makes it possible to prevent occurrence of an assembling failure due to damage or breakage caused during assembling of the operation ring part.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

This application claims the benefit of Japanese Patent Application No. 2018-027049 filed Feb. 19, 2018, which is hereby incorporated by reference herein in its entirety.

What is claimed is:

1. An optical apparatus that includes an operation ring part having at least a first operation ring and a second operation ring, which are arranged along a predetermined axis, and are rotatable about the predetermined axis, comprising:
a first detection section that detects rotation of the first operation ring;
a second detection section that detects rotation of the second operation ring;
a transmission mechanism that is moved in accordance with rotation of the second operation ring, and transmits rotation of the second operation ring to the second detection section; and
a regulation member that regulates a range of rotation of the second operation ring to a predetermined angle range,
wherein when assembling the operation ring part, the first detection section and the second detection section are inserted from the same direction, and the first detection section is disposed in an angle range excluding an angle range through which the transmission mechanism is moved when the second operation ring is rotated through the predetermined angle range,
wherein the transmission mechanism includes a first gear which is provided on the second operation ring, and a second gear which is provided on the second detection section, and is meshed with the first gear, and
wherein the first detection section is arranged in a range where the first gear does not pass.

2. The optical apparatus according to claim 1, wherein the first gear is formed along an inner peripheral surface of the second operation ring, and
wherein the second gear is moved along the inner peripheral surface in accordance with rotation of the second operation ring.

3. The optical apparatus according to claim 2, further comprising a third detection section that detects rotation of the second operation ring, and
wherein the transmission mechanism further includes a third gear that is provided on the third detection section, and is meshed with the first gear, and
wherein the third gear and the second gear are moved within different ranges on the inner peripheral surface.

4. The optical apparatus according to claim 3, wherein the first detection section is arranged in a range where the third gear and the second gear do not pass.

5. The optical apparatus according to claim 3, wherein the second detection section is an encoder for magnetically or optically detecting rotation of the second operation ring, and
wherein the third detection section is a potentiometer for detecting a rotational position of the second operation ring using a resistor.

6. The optical apparatus according to claim 1, wherein the optical apparatus is an image pickup apparatus including a photographic lens unit, and
wherein the first operation ring and the second operation ring are arranged along an outer periphery of the photographic lens unit having an optical axis of the photographic lens unit as the predetermined axis.

7. An optical apparatus that includes an operation ring part having at least a first operation ring and a second operation ring, which are arranged along a predetermined axis, and are rotatable about the predetermined axis, comprising:
a first detection section that detects rotation of the first operation ring;
a second detection section that detects rotation of the second operation ring;
a transmission mechanism that is moved in accordance with rotation of the second operation ring, and transmits rotation of the second operation ring to the second detection section;
a regulation member that regulates a range of rotation of the second operation ring to a predetermined angle range; and
a controller that performs processing corresponding to rotation of the first operation ring and the second operation ring,
wherein when assembling the operation ring part, the first detection section and the second detection section are inserted from the same direction, and the first detection section is disposed in an angle range excluding an angle range through which the transmission mechanism is moved when the second operation ring is rotated through the predetermined angle range, and
wherein outputs of at least the first detection section and the second detection section are connected to the controller by the same wiring.

8. The optical apparatus according to claim 7, wherein the optical apparatus is an image pickup apparatus including a photographic lens unit, and
wherein the first operation ring and the second operation ring are arranged along an outer periphery of the photographic lens unit having an optical axis of the photographic lens unit as the predetermined axis.

* * * * *